United States Patent Office 3,647,816
Patented Mar. 7, 1972

3,647,816
N-SUBSTITUTED IMIDAZOLES AND THEIR SALTS
Wilfried Draber, Karl-Heinz Buchel, and Manfred Plempel, Wuppertal-Elberfeld, Germany, assignors to Farbenfabriken Bayer Aktiengesellschaft, Leverkusen, Germany
No Drawing. Filed Nov. 12, 1969, Ser. No. 876,033
Claims priority, application Germany, Nov. 29, 1968,
P 18 11 654.6
Int. Cl. C07d 49/36
U.S. Cl. 260—309                                  21 Claims

ABSTRACT OF THE DISCLOSURE

Certain imidazoles and their salts having fungistatic properties are provided which have the following basic structure:

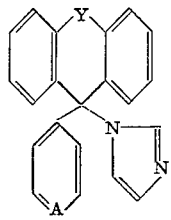

in which Y is $-(CH_2)_n-$, $-CH=CH-$, O or S; A is N or CH; and $n$ is 0, 1 or 2. Typical fungi are trichophyton species, Microsporon species, Candida species and Penicillium species. These compounds are also active against pathogenic protozoa, viruses and bacteria.

---

The present invention relates to certain new N-substituted imidazoles and salts thereof, to a process for their production and to the formulation and use thereof as pharmaceutical and fungistatic agents.

The present invention provides N-substituted imidazoles of the formula:

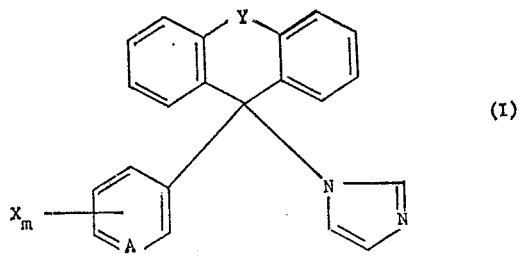

in which
X is an alkyl or mercaptoalkyl radical or an electronegative substituent,
Y is $-(CH_2)_n-$, $-CH=CH-$, O or S,
A is N or CH,
$m$ is 0, 1 or 2, and
$n$ is 0, 1 or 2, and pharmaceutically acceptable salts thereof.

When X is an alkyl or mercaptoalkyl radical it preferably has 1 to 4 carbon atoms. When it is an electronegative substituent it may for example be a halogen (fluorine, chlorine, bromine or iodine), or a nitro, cyano or trifluoromethyl group.

When salts of the pharmaceutical agents are to be used, they must be physiologically compatible acceptable salts. Examples of inorganic acids yielding such salts include the halogen hydracids, phosphoric acids, sulphonic acids, mono- and dicarboxylic acids and hydroxy-carbonylic acids. Suitable examples of organic acids are acetic acid, maleic acid, succinic acid, tartaric acid, lactic acid, citric acid, salicylic acid, sorbic acid and naphthalene-di-sulphonic acid-1,5. The salts with halogen hydacids, particularly hydrochloric acid, lactic acid and salicylic acid are of specially important interest.

The invention also provides a process for the production of the N-substituted imidazoles of the invention which comprises reacting a compound of the formula:

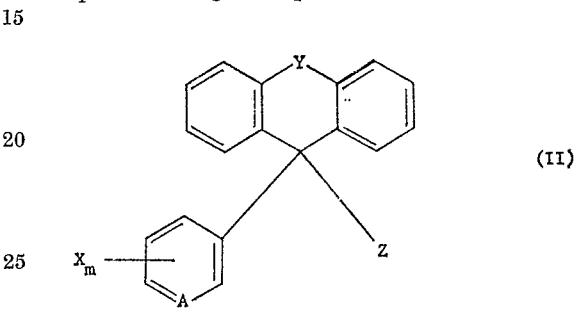

in which X, Y, A and $m$ have the above meanings, and Z is OH, chlorine or bromine, when Z is OH after reaction with a halogenating agent, optionally in the presence of an acid acceptor, with at least the theoretically required amount of imidazole in a polar organic solvent at a temperature of 20° to 120° C., preferably at 80° to 100° C.

When the process is started from a compound in which Z is OH, then the halogenation may be carried out in an inert organic solvent, such as ether, petroleum ether, methylene chloride, benzene or toluene. All reagents suitable for the halogenation of tertiary alcohols can be used as halogenating agents, such as thionyl chloride, thionyl bromide, phosphoryl chloride, phosphoryl bromide, acetyl chloride and acetyl bromide. The halogenation is normally effected with a temperature range of 0° to 100° C., preferably at 10° to 30° C., and after completion of the halogenation the solvent is replaced by a polar solvent. In some cases it may be advantageous to carry out the halogenation itself in a polar solvent directly followed, without intermediate isolation of the halide formed, by the reaction with the imidazole.

Suitable polar organic solvents include acetonitrile, nitromethane, acetone, diethyl ketone, dimethylformamide, dimethyl sulphoxide, etc.

In carrying out the reaction, the tri-substituted methyl halide may be slowly added to a solution of the imidazole which is either in solution or in the solid form.

The reaction mixture may be worked up in conventional manner, for example by concentrating or after diluting with water.

In a preferred method of carrying out the present process, the starting compound (II) is reacted with the theoretically required amount of imidazole together with the theoretically required amount of an acid-acceptor. Suitable acid-acceptors include the usual organic bases, such as triethylamine, pyridine, dimethyl-benzylamine or an alkylpyridine, and also inorganic compounds, for example alkali metal or alkaline earth metal carbonates.

Some of the new compounds which can be prepared by the methods of Examples 1–3 are listed in Table 1, in which the meanings of X, Y, A, and $m$ in Formula I are indicated for the various compounds.

TABLE 1

| | m | X | A | Y | M.P., °C. |
|---|---|---|---|---|---|
| (a) | 0 | | CH | | 197–199 |
| (b) | 1 | 4-F | CH | | 156–159 |
| (c) | 1 | 4-Cl | CH | | 176–180 |
| (d) | 1 | 4-Br | CH | | 181–184 |
| (e) | 1 | 4-SCH₃ | CH | | 164–165 |
| (f) | 1 | 3-CF₃ | CH | | 134–138 |
| (g) | 1 | 3-Cl | CH | | 116–119 |
| (h) | 1 | 2-Cl | CH | | 156–158 |
| (i) | 0 | | CH | —(CH₂)₂— | 186–187 |
| (k) | 1 | 4-Cl | CH | —(CH₂)₂— | 216–218 |
| (l) | 1 | 4-F | CH | —(CH₂)₂— | 178–180 |
| (m) | 0 | | CH | —O— | 160–162 |
| (n) | 0 | | CH | —S— | 179–181 |
| (o) | 0 | | CH | —CH=CH— | 208–211 |
| (p) | 1 | 4-F | CH | —CH=CH— | 230–231 |
| (q) | 1 | 4-Cl | CH | —CH=CH— | 231 |
| (r) | 1 | 4-Br | CH | —CH=CH— | |
| (s) | 1 | 2-Cl | CH | —CH=CH— | 210–215 |
| (t) | 1 | 3-CF₃ | CH | —CH=CH— | 118–120 |
| (u) | 1 | 3-Cl | CH | —CH=CH— | 199–201 |
| (v) | 1 | 3-CF₃ | CH | —CH₂—CH₂— | 115–118 |
| (w) | 0 | | 3-N | | 80–85 |
| (x) | 0 | | 3-N | —CH₂—CH₂— | 147–149 |
| (y) | 1 | 3-CF₃ | CH | —CH₂—CH₂— | 115–118 |
| (z) | 1 | 4-SCH₃ | CH | —CH₂—CH₂— | 180–183 |
| (α) | 1 | 2-CH₃ | CH | | 161–163 |

EXAMPLE 1

9-(4-fluorophenyl)-9-imidazolyl-fluorene 27.6 g. (0.1 mol) of 9-(4-fluorophenyl)-fluorenol-9 were dissolved in 250 ml. of dry methylene chloride and mixed at room temperature with 13.0 g. (0.11 mol) of thionyl chloride. The mixture was allowed to stand for 30 minutes, then boiled under reflux for 5 minutes and concentrated. The solid residue was washed with a little acetone and dried. Portions of the 9-(4-fluorophenyl)-9-chlorofluorene obtained in this way were introduced into a solution at 80° C. of 20 g. of imidazole in 150 ml. of anhydrous acetonitrile. After 10 minues the hot solution was filtered, concentrated and the residue mixed with water. After suction-filtration and trituraion of the residue with ether, 31 g. of a yellowish crude product were obtained. Recrystallization from ethanol yielded 18.0 g. (55%) of colorless crystals of the formula:

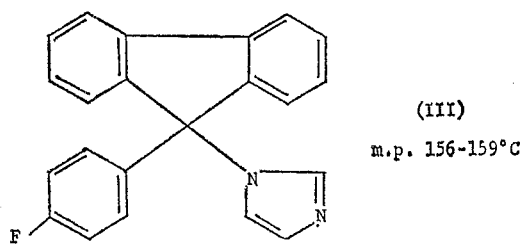

(III)

m.p. 156-159°C

EXAMPLE 2

5-phenyl-5-imidazolyl-[a,d]-dibenzocycloheptane

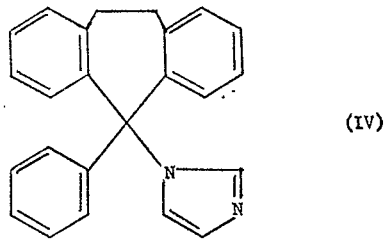

(IV)

15.2 g. (0.05 mol) of 5-phenyl-5-chloro-[a,d]-dibenzocycloheptane were added in portions to a boiling solution of 6.8 g. (0.10 mol) of dry imidazole in acetonitrile. The mixture was boiled for 10 minutes and then cooled to 0° C. After the addition of 100 ml. of ether, it was filtered off with suction. The residue was washed first with water and then with 100 ml. of ether. The combined ether filtrates were shaken out three times with portions of 200 ml. of water, then dried and concentrated. The residue was mixed with a little ethanol, cooled, filtered off with suction, washed with a little cold ether, combined with the filter residue first obtained, and dried. The total yield of the compound of the above formula: 13.1 g. (78%): white leaflets of M.P. 186–187° C.

The starting compound was obtained as follows: 28.6 g. (0.10 mol) of 5-phenyl-5-hydroxy-[a,d]-dibenzocycloheptane were suspended in 100 ml. of dry methylene chloride and mixed with 13.8 g. (0.12 mol) of thionylchloride. A vigorous SO₂ evolution started after a few minutes. The mixture was allowed to stand for 30 minutes, then boiled for 5 minutes and concentrated. The residue was recrystallized from light petrol. There were obtained 24.4 g. (80%) of 5-phenyl-5-chloro-[a,d]-dibenzocycloheptane of M.P. 115° C. (decomposition).

EXAMPLE 3

10-phenyl-10-imidazolyl-thioxanthene 29.0 g. (0.10 mol) of 10-phenyl-10-hydroxy-thioxanthene were boiled for one hour with 40 g. of acetyl chloride in 100 ml. of dry petroleum ether (40/60). The clear solution was decanted from a small amount of an oily precipitate and concentrated. The residue was taken up with 200 ml. of dry acetonitrile and the mixture boiled under reflux for 3 hours with 13.6 g. of dry imidazole. The mixture was subsequently concentrated, the residue mixed with water, filtered off with suction and dried. The crude product was recrystallized from cyclohexane. Yield: 17.5 g. (57%) of 10-phenyl-10-imidazolylthioxanthene of M.P. 179–181° C.

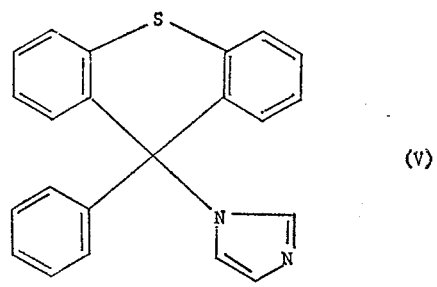

(V)

EXAMPLE 4

The compound

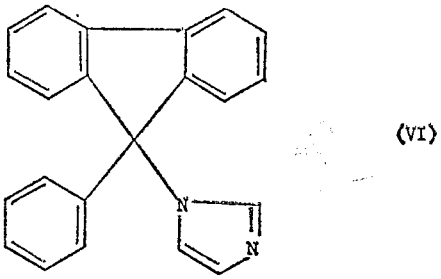

(VI)

M.P. 197–199° C., which is compound (a) from Table 1, is produced in an analogous manner to that described in the preceding examples.

EXAMPLE 5

The compound

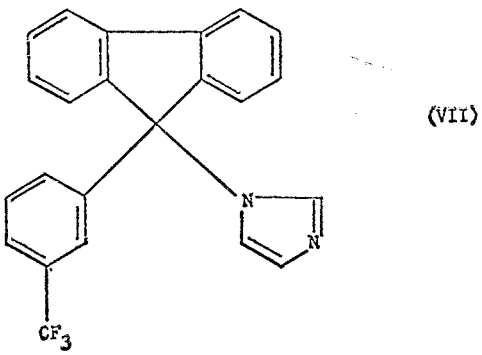

(VII)

M.P. 134–138° C., which is compound (f) from Table 1, is produced in an analogous manner to that described in the preceding examples.

EXAMPLE 6

The compound

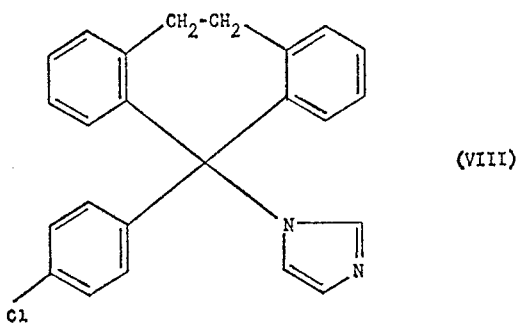

(VIII)

M.P. 216–218° C., which is compound (k) from Table 1, is produced in an analogous manner to that described in the preceding examples.

The same results were achieved when the chlorides were replaced by bromides as starting compounds.

The free N-substituted imidazoles were converted into their salts in the usual manner, for example by heating in acetonitrile with somewhat more than the stoichiometrically required amount of the corresponding acid and subsequent isolation. The hydrochlorides are expediently obtained by passing in hydrogen chloride into the solution of the imidazole derivative, for example in carbon tetrachloride.

The following salts of the compounds (c), (e), (k) and (l) have the stated melting points:

fumarate of (c): 182° C. (decomposition)
hydrochloride of (e): starting at 90° C. (decomposition)
tartrate of (k): 186° C. (decomposition)
salicylate of (l): 137° C.–138° C.

The new N-substituted imidazoles are valuable pharmaceutical agents. Their microbiological effectiveness can be seen from the description below.

In vitro on Sabouraud's Milieu d'Epreuve and in meat extract/glucose broth the new compounds exhibit a good fungistatic action against fungi pathogenic to humans such as:

Trichophyton species, especially *Trich. ment.*, *Trich. rubrum*, *Epidermophyton floccosum*.
Microsporon species, especially *M. canis*, *M. felineum* and *M. audouini*.
Candida species, especially *Candida albicans*.

Further gemmiparous fungi, especially Cryptococci, Histoplasma and Coccidioides species.

Aspergilles, especially *A. fumigatus*, *A. niger* and *A. nidulans*.
Penicillium species, especially *Pen. commune*.
Chromomycetes (Hormodendrum and Phialophora species).

The minimum inhibitory concentrations against some of the above fungi are given in Table 2 (in which the compounds are the indicated compounds of Table 1).

TABLE 2

| Compound | Trichoph. ment. and Microsporon canis | | Candida alb. | | Asperg. niger | Penicillin |
|---|---|---|---|---|---|---|
| | With serum | Without serum | With serum | Without serum | | |
| (a) | <4γ | <4γ | 10-4γ | <4γ | <4γ | <4γ |
| (b) | <4γ | <4γ | 100γ | 4-10γ | <4γ | <4γ |
| (c) | <4γ | <4γ | 40γ | 4γ | 10γ | <4γ |
| (d) | <10γ | <4γ | 20γ | <4γ | <4γ | 4 |
| (e) | <4γ | <4γ | 100γ | 10γ | 100γ | 100γ |
| (f) | <4γ | <4γ | 20γ | <4γ | <4γ | <4γ |
| (g) | <4γ | <4γ | 40γ | <4γ | 4γ | <4γ |
| (h) | <4γ | <4γ | 20γ | <4γ | <4γ | <4γ |
| (i) | <4γ | <4γ | 40γ | <4γ | <4γ | <4γ |
| (k) | <4γ | <4γ | 4γ | 4γ | | |
| (l) | 10γ | <4γ | 100γ | 100γ | <4γ | 10γ |
| (m) | >100γ | >100γ | 100γ | 20γ | | 100γ |
| (n) | >100γ | >100γ | 40γ | 40γ | | 100γ |
| (w) | <4γ | <4γ | 100γ | 40γ | 100γ | 20γ |
| (v) | 10γ | 4γ | 4γ | 10γ | | 40γ |
| (x) | 10γ | <4γ | 10γ | 10γ | | 40γ |

In vivo, the preparations were therapeutically applied as follows:

(1) In an experiment carried out on white mice infected with Candida. When doses of 50–100 mg./kg. body weight were orally given once or twice daily, more than 80% of the animals survived the infection, whereas 95–100% of the untreated infected control animals died due to the infection 6 days p.i. The compounds (a), (d) and (f) of Table 1 were especially effective in this experimental arrangement.

(2) In an experiment carried out on white mice infected with *Trichophyton quinckeanum*, the typical Quinckeanum dermatomycosis was treated with the compounds (a), (d) and (f) with 2 mg./mouse orally per day (100 mg./kg.). The course of the dermatomycosis was substantially shortened by this therapy; in a prophylactic experiment the development of the infection could be suppressed with the above-indicated dosage.

(3) When locally applied to guinea pigs infected with *Trich. ment.* particularly, for example, the compounds (a), (f), (g) and (k), dissolved 1% in dimethylsulphoxide/glycerol, have a good therapeutic action.

For humans the dosage amounts, on the average, to about 20 to about 60 mg./kg. body weight, preferably 30 to about 50 mg./kg. body weight, given at intervals of up to 12 hours for a period of about 12 to about 20 days.

It may sometimes be necessary to deviate from the aforementioned quantities, depending for example on the method of application, the individual reaction to the medicament, its formulation, and the moment of time or interval at which it is administered. It may thus be sufficient in some cases to manage with less than the abovementioned minimum amount, whereas in other cases the indicated upper limit may have to be exceeded. If larger quantities are administered, it may be advisable to distribute these in several individual doses over the day.

The chemotherapeutic agents can be used as such or in combination with pharmaceutically acceptable solid or liquid carriers. Suitable forms of application, in combination with various inert carriers, are the following: tablets, capsules, powders, sprays, aqueous suspensions, injectable solutions, elixirs, syrups and the like. Such carriers comprise solid diluents (or fillers), a sterile aqueous medium, non-toxic organic solvents and the like. Tablets and the like intended for oral use may be provided with sweetening additives and similar substances. The therapeutically active compound should normally be present at a concentration of 0.5 to 90 percent by weight of the total mixture, in quantities which are sufficient to achieve the range of dosage mentioned above.

For oral application, the tablets can also contain additives, such as sodium nitrate, calcium carbonate and dicalcium phosphate together with various other additives, such as starch (preferably potato stach) and the like, and binding agents, such as polyvinylpyrrolidone, gelatin and the like. Lubricants, such as magnesium stearate, sodium lauryl sulphate and talc may also be used concurrently for the production of the tablets. In the case of aqueous suspensions and/or elixirs which are intended for oral use, the active substance may be provided with various agents improving the flavor, coloring substances, emulsifiers and/or other diluents, such as water, ethanol, propylene glycol, glycerol and similar compounds or combinations thereof.

In the case of parenteral application, solutions of the active substances in sesame or peanut oil, or in aqueous propylene glycol or N,N-dimethylformamide can be employed as well as sterile aqueous solutions in the case of water-soluble compounds. Aqueous solutions of this kind should be buffered in the usual manner if necessary; furthermore, the liquid diluent should be rendered isotonic from the start by the addition of the necessary amount of salt or glucose. Such aqueous solutions are particularly suitable for intravenous, intramuscular and intraperitoneal injections. Sterile aqueous media of this kind may be prepared in known manner.

For topical application (e.g. solutions, creams, ointments) preferably a concentration of about 0.5 to 10 percent is used.

In the case of mice, rats, rabbits, dogs and cats the $LD_{50}$ of the above compounds ranges from about 500 to 900 mg./kg. of body weight when orally administered.

The invention therefore also provides a pharmaceutical composition comprising at least one of the new active compounds or salts in admixture with a solid or liquid diluent or carrier.

The invention further provides a medicament in dosage unit form comprising at least one of the new active compounds either alone or in admixture with a solid or liquid diluent or carrier. The medicament may include a protective envelope containing the active compound and, if used, the diluent or carrier.

The term "medicament in dosage unit form" as used in the present specification means a medicament as defined above in the form of discrete portions each containing a single or unit dose, or a multiple or sub-multiple of a unit dose of the active compound or compounds. Such portions may, for example, be in monolithic coherent form, such as tablets, suppositories, pills or dragees; in wrapped or concealed form, such as wrapped powders, cachets, sachets or capsules; in ampoules, either free or as a sterile solution suitable for parenteral injection; or in any other form known to the art.

In addition to their antimycotic activity, the compounds show good activity against pathogenic protoza, e.g. Trypanosoma, Trichomonas, *Entamoeba histolytica,* malaria parasites, Toxoplasma and against viruses and bacteria, e.g. Staphylococci, Streptococci, Klebsiella, *E. coli.* Further the compounds activate the granulation in wound heaing and show a hypocholesterinaemic activity.

What is claimed is:

1. An N-substituted imidazole of the formula:

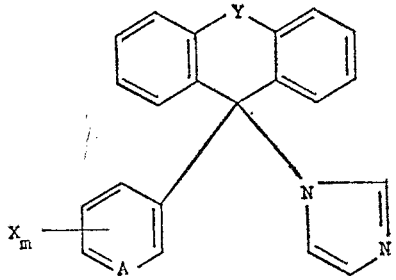

in which
X is alkyl of 1 to 4 carbon atoms, mercaptoalkyl of 1 to 4 carbon atoms in the alkyl moiety, halogen, nitro, cyano or trifluoromethyl,
Y is —$(CH_2)_n$— or —CH=CH—,
A is CH,
m is 0 or 1 and
n is 0, 1 or 2,
or a pharmaceutically acceptable salt thereof.

2. The compound of claim 1 which is

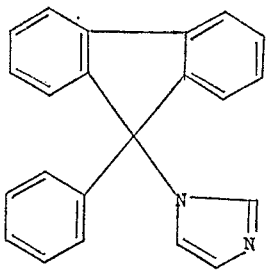

(VI)

3. The compound of claim 1 which is

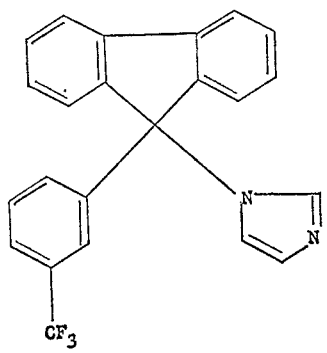

(VII)

4. The compound of claim 1 which is

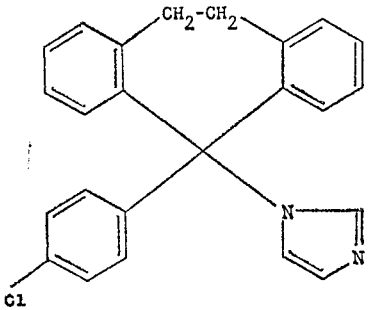

(VIII)

5. The compound according to claim 1, wherein X is 4–F, A is CH and m is 1.

6. The compound according to claim 1, wherein X is 4-Cl, A is CH and m is 1.

7. The compound according to claim 1, wherein X is 4-Br, A is CH and m is 1.

8. The compound according to claim 1, wherein X is 4-SCH$_3$, A is CH and m is 1.

9. The compound according to claim 1, wherein X is 3-Cl, A is CH and m is 1.

10. The compound according to claim 1, wherein X is 2-Cl, A is CH and m is 1.

11. The compound according to claim 1, wherein X is 4-F, Y is —$(CH_2)_2$—, A is CH and m is 1.

12. The compound according to claim 1, wherein X is 4-F, Y is —CH=CH—, A is CH and m is 1.

13. The compound according to claim 1, wherein X is 4-Cl, Y is —CH=CH—, A is CH and m is 1.

14. The compound according to claim 1, wherein X is 4-Br, Y is —CH=CH—, A is CH and m is 1.

15. The compound according to claim 1, wherein X is 2-Cl, Y is —CH=CH—, A is CH and m is 1.

16. The compound according to claim 1, wherein X is 3-CF$_3$, Y is —CH=CH—, A is CH and m is 1.

17. The compound according to claim 1, wherein X is 3-Cl, Y is —CH=CH—, A is CH and m is 1.

18. The compound according to claim 1, wherein X is 3-CF$_3$, Y is —CH$_2$—CH$_2$—, A is CH and m is 1.

19. The compound according to claim 1, wherein X is 3-CF$_3$, Y is —CH$_2$—CH$_2$—, A is CH and m is 1.

20. The compound according to claim 1, wherein X is 4-SCH₃, Y is —CH₂—CH₂—, A is CH and m is 1.

21. The compound according to claim 1, wherein X is 2-CH₃, A is CH and m is 1.

References Cited

UNITED STATES PATENTS

| | | | |
|---|---|---|---|
| 3,530,183 | 9/1970 | Kyburz et al. | 260—309 |
| 3,547,942 | 12/1970 | Godefroi et al. | 260—309 |

FOREIGN PATENTS

| | | | |
|---|---|---|---|
| 585,555 | 4/1960 | Belgium | 260—309 |

OTHER REFERENCES

Blicke et al., J. Amer. Chem. Soc., vol. 58, pp. 559–62 (1936). QD1.A5.

Lester et al., J. Amer. Chem. Soc., vol. 68, pp. 375–80 (1946). QD1.A5.

Wittig et al., Berichte, vol. 75, pp. 1491–1500 (1942). QDI.D4.

NATALIE TROUSOF, Primary Examiner

U.S. Cl. X.R.

260—290 HL, 294.8 B, 296 T, 328, 335; 424—263, 273